US012591119B2

(12) United States Patent
Kim

(10) Patent No.: US 12,591,119 B2
(45) Date of Patent: Mar. 31, 2026

(54) CAMERA MODULE

(71) Applicant: Samsung Electro-Mechanics Co., Ltd., Suwon-si (KR)

(72) Inventor: Sungyeon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 311 days.

(21) Appl. No.: 18/534,266

(22) Filed: Dec. 8, 2023

(65) Prior Publication Data

US 2024/0302631 A1     Sep. 12, 2024

(30) Foreign Application Priority Data

Mar. 10, 2023     (KR) ........................ 10-2023-0031801

(51) Int. Cl.
G02B 13/00     (2006.01)
(52) U.S. Cl.
CPC ................................ G02B 13/0065 (2013.01)
(58) Field of Classification Search
CPC ... G02B 13/0065; G02B 27/646; G03B 17/17
See application file for complete search history.

(56) References Cited

U.S. PATENT DOCUMENTS

2017/0038661 A1     2/2017  Ha
2018/0224665 A1*    8/2018  Im ............................. G02B 7/08

FOREIGN PATENT DOCUMENTS

| JP | 2003-149595 A | 5/2003 |
| JP | 2005-266587 A | 9/2005 |
| KR | 10-2217098 B1 | 2/2021 |
| KR | 10-2354161 B1 | 1/2022 |
| KR | 10-2022-0044927 A | 4/2022 |
| KR | 10-2022-0162547 A | 12/2022 |

OTHER PUBLICATIONS

KR 20220162547 A machine translation (Year: 2022).*
Korean Office Action Issued on Apr. 19, 2025, in Counterpart Korean Patent Application No. 10-2023-0031801 (6 Pages in English, 5 Pages in Korean).
Korean Notice of Allowance Issued on Jul. 23, 2025, in Counterpart Korean Patent Application No. 10-2023-0031801 (1 Page in English, 2 Pages in Korean).

* cited by examiner

*Primary Examiner* — James A Dudek
(74) *Attorney, Agent, or Firm* — NSIP Law

(57)     ABSTRACT

A camera module that internally reflects and transmits light, incident in a first direction, in a second direction perpendicular to the first direction, includes a housing with an inner space; a cover coupled to the housing to cover the inner space; a folded module comprising a moving holder movable in the inner space, and a reflective member disposed on the moving holder to change a path of light incident on the reflective member; and a lens module comprising a lens barrel adjacently disposed to the folded module in the inner space and having a plurality of lenses arranged in an optical axis direction to pass light reflected from the reflective member. The cover includes a cover protrusion extending from a surface facing the moving holder, and the moving holder has a groove portion that is opened upward to accommodate the cover protrusion.

17 Claims, 6 Drawing Sheets

CAMERA MODULE

CROSS-REFERENCE TO RELATED APPLICATION

This application claims the benefit under 35 USC § 119(a) of Korean Patent Application No. 10-2023-0031801 filed in the Korean Intellectual Property Office on Mar. 10, 2023, the entire disclosure of which is incorporated herein by reference for all purposes.

BACKGROUND

(a) Field

The following description relates to a camera module.

(b) Description of the Background

Portable electronic devices such as smartphones, tablet PCs, and laptop computers include cameras with an auto-focus (AF) function, an image stabilizer (IS) function, and a zoom function.

As the performance of a camera module progresses, the distance between a prism holder and a damper has also increased to smoothly implement the autofocus function, the image stabilizer function, and the zoom function. For this reason, there is a desire to prevent an OIS ball from being separated due to a drop impact or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a camera module that internally reflects and transmits light, incident in a first direction, in a second direction perpendicular to the first direction, includes a housing with an inner space; a cover coupled to the housing to cover the inner space; a folded module comprising a moving holder movable in the inner space, and a reflective member disposed on the moving holder to change a path of light incident on the reflective member; and a lens module comprising a lens barrel adjacently disposed to the folded module in the inner space and having a plurality of lenses arranged in an optical axis direction to pass light reflected from the reflective member. The cover includes a cover protrusion extending from a surface facing the moving holder, and the moving holder has a groove portion that is opened upward to accommodate the cover protrusion.

The cover protrusion may extend in the first direction.

The cover protrusion may be disposed on a lower surface of the cover along the first direction.

The cover protrusion may include a plurality of cover protrusions disposed and spaced apart from each other along a third direction perpendicular to the first direction and the second direction.

The groove portion may have a cavity in the first direction.

The groove portion may be disposed on an upper surface of the moving holder along the first direction.

The groove portion may include a plurality of groove portions disposed and spaced apart from each other along a third direction perpendicular to the first direction and the second direction.

The plurality of groove portions may be disposed on both sides of the reflective member.

Along the optical axis direction, a width of the cover protrusion may be smaller than a width of the groove portion.

The camera module may further include a damper disposed between the folded module and the lens module inside the housing. A distance between the cover protrusion and the groove portion, along the optical axis direction, may be larger than a distance between the moving holder and the damper, along the optical axis direction.

The camera module may further include a middle guide disposed between the housing and the moving holder, along the optical axis direction, and a plurality of ball members disposed on the middle guide. Along the optical axis direction, a maximum distance between the middle guide and the housing may be smaller than a diameter of the plurality of ball members.

The middle guide may have a plurality of guide grooves accommodating the plurality of ball members.

The cover protrusion may have a cylindrical shape.

In one or more general aspects, a folded camera module includes a cover coupled to a housing to cover an inner space of the housing; a folded module, including a moving holder movable in the inner space, and a reflective member disposed on the moving holder to change a path of light incident on the reflective member; and a lens module including a lens barrel adjacently disposed to the folded module in the inner space and having a plurality of lenses arranged in an optical axis direction to pass light reflected from the reflective member. The cover includes a cover protrusion extending from a surface facing the moving holder, and the moving holder has a groove portion accommodating the cover protrusion and the cover protrusion is slidable within the groove portion.

The cover protrusion may extend in a first direction, a light incident direction, and disposed on a lower surface of the cover along the first direction.

The groove portion may be disposed on an upper surface of the moving holder along the first direction.

The folded camera module may further include a damper disposed between the folded module and the lens module inside the housing. A distance between the cover protrusion and the groove portion, along the optical axis direction, may be larger than a distance between the moving holder and the damper, along the optical axis direction.

Other features and aspects will be apparent from the following detailed description, the drawings, and the claims.

BRIEF DESCRIPTION OF THE DRAWINGS

FIG. 4 illustrates a perspective view of a cover according to an embodiment.

FIG. 6 illustrates a partially cross-sectional view of the cover and the moving holder shown in FIG. 1, taken along lines VI-VI'.

Figure 1:
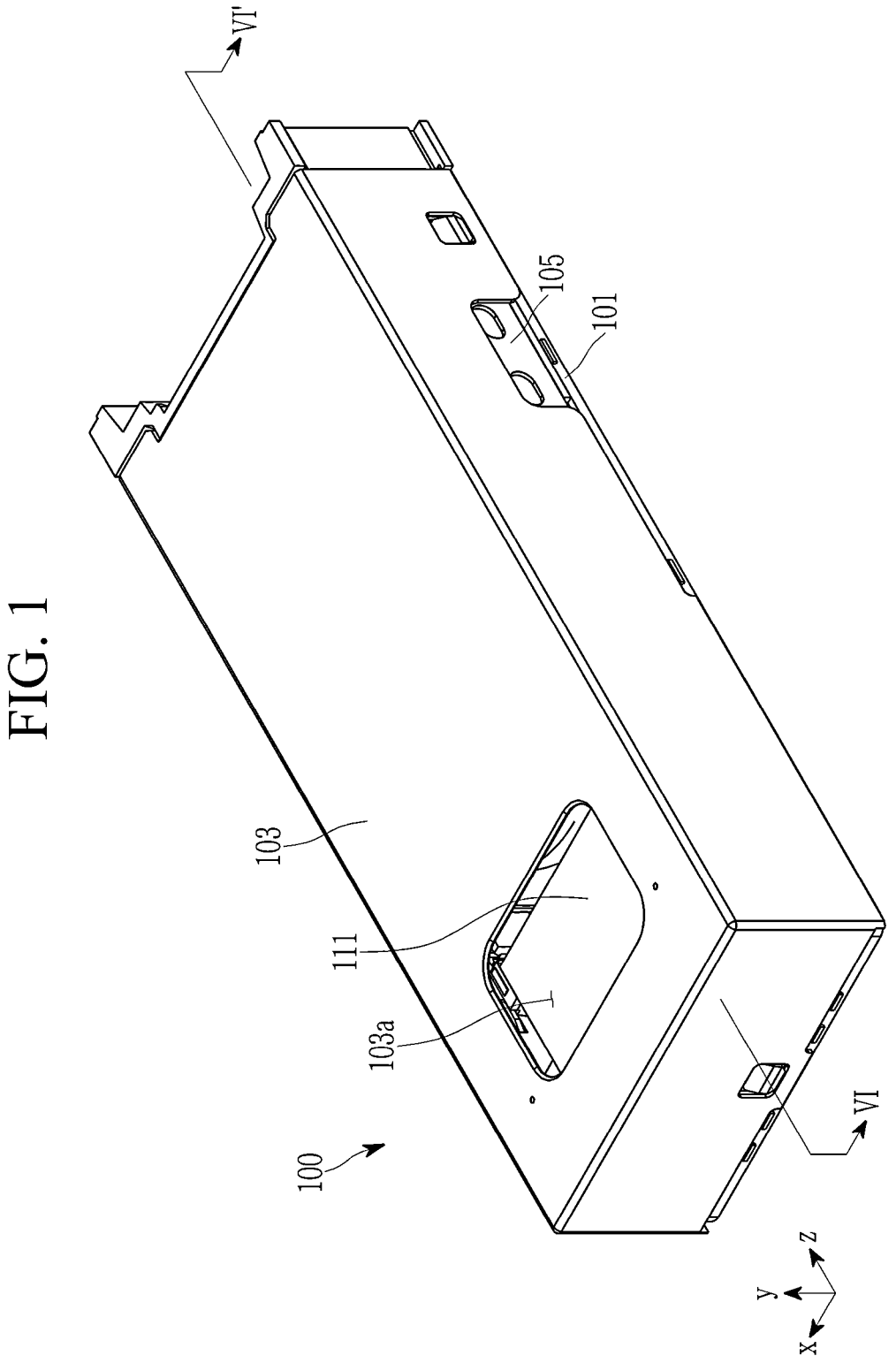
FIG. 1 illustrates a perspective view of a camera module according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 2:
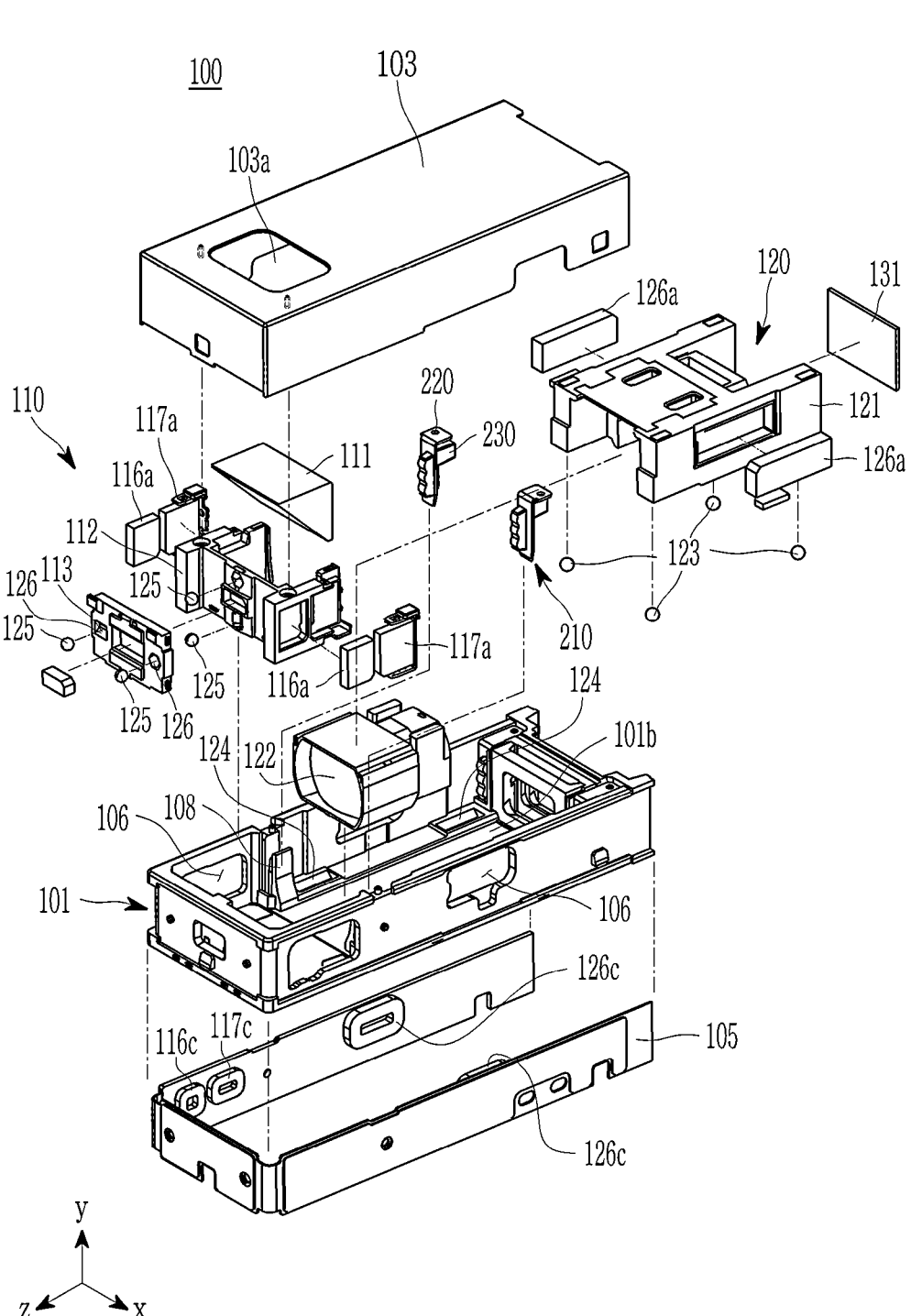
FIG. 2 illustrates a schematically exploded perspective view of the camera module illustrated in FIG. 1.

FIG. 1 illustrates a perspective view of a camera module according to an embodiment, and FIG. 2 illustrates a schematically exploded perspective view of the camera module illustrated in FIG. 1.

Referring to FIG. 1 and FIG. 2, a camera module 100, according to the present embodiment, may include a folded module 110, a lens module 120, and an image sensor module. The folded module 110 and the lens module 120 are accommodated inside a housing 101. A cover 103 partially surrounds the upper and side surfaces of the housing 101, and partially forms an exterior of the camera module 100. Here, the cover 103 may be a shield can. The camera module 100, according to the present embodiment, may internally reflect and transmit light, incident in a first direction (a light incident direction, a y-axis direction in the drawing), in a second direction (a light axis direction, a z-axis direction in the drawing) perpendicular to the first direction. In addition, a third direction (an x-axis direction in the drawing) may mean a direction perpendicular to the first and second directions.

The folded module 110 may be configured to change the direction of light incident from the outside. Light entering the camera through an opening 103a of the cover 103 may be reflected toward the lens module 120 by the folded module 110. In the present embodiment, the folded module 110 may include a reflective member 111 and a moving holder 112. The reflective member 111 may be provided in the form of, for example, a prism or a mirror. The reflective member 111 may be mounted on the moving holder 112. The moving holder 112 may be disposed so as to be movable in an inner space of the housing 101.

The lens module 120 may include a carrier 121 movably provided in the inner space of the housing 101 in an optical axis direction, and a lens barrel 122 fixed to the carrier 121 and having at least one lens therein. The light reflected from the folded module 110 may be refracted while passing through the lens module 120. The light passing through the lens module 120 may be incident on an image sensor 131. When the lens module includes a plurality of lenses, the plurality of lenses may be disposed in the optical axis direction.

The image sensor module (not shown) may include an image sensor 131 and a substrate (not shown) on which the image sensor 131 is mounted. An image is formed on an image-forming surface (or upper surface) of the image sensor 131, and in response to this, the image sensor 131 generates an image signal for the formed image, and the image signal may be transmitted to an external circuit through the substrate (not shown).

The camera module 100, according to the present embodiment, may provide an autofocus (AF) function and an optical image stabilization (OIS) function.

The lens module 120 may adjust a focal distance while reciprocating along the optical axis. The AF driver may be disposed at a side portion of the lens module 120. In the present embodiment, an AF magnet 126a may be installed in the lens module 120, and an AF coil 126c may be disposed at a position opposite to the AF magnet 126a. The lens module 120 may move along the optical axis by electromagnetic interaction between the AF coil 126c and the AF magnet 126a. The AF coil 126c may be mounted on a substrate 105 attached to the housing 101, and the housing 101 may have an opening 106 so that the AF coil 126c and the AF magnet 126a may face each other.

For smooth driving, a plurality of AF ball members 123 may be disposed between the lens module 120 and a bottom surface 101b of the housing 101. The lens module 120 and the bottom surface 101b of the housing 101 may include a plurality of AF guide grooves 124 accommodating at least one of the plurality of AF ball members 123. The plurality of AF guide grooves 124 extend in a direction parallel to the optical axis, and the movement direction of the plurality of AF ball members 123 may be limited to the extension direction of the plurality of AF guide grooves 124 (that is, the optical axis direction).

A pulling member may be disposed between the lens module 120 and the housing 101 to pull the lens module 120 toward the bottom surface 101b of the housing 101. In the present embodiment, the pulling member may include a yoke disposed on the AF magnet 126a and the bottom surface 101b of the housing 101. In another embodiment, a separate magnet distinguished from the AF magnet 126a may be mounted on a lower surface of the lens module 120, and a yoke may be disposed in a portion facing the separate magnet.

The lens module 120 is pulled toward the bottom surface 101b of the housing 101 by the magnetic attraction between the yoke and the AF magnet 126a (or the separate magnet). Accordingly, the plurality of AF ball members 123 may maintain a state of close contact with the lens module 120 and the plurality of AF guide grooves 124 of the bottom surface 101b of the housing 101, which smooths out the optical axis movement of the lens module 120. That is, the pulling member prevents the lens module 120 from moving in a direction other than the optical axis direction (for example, the y-axis direction or the x-axis direction) and contributes to improving AF performance.

A position sensor configured to measure the position of the lens module 120 in the optical axis direction may be disposed inside or outside the AF coil 126c.

The OIS function may be implemented by rotating the folded module 110 based on an axis perpendicular to the optical axis.

For example, when the light incident axis is referred to as the first axis, the first axis may be parallel to the y-axis of the drawing; the second axis may be an axis perpendicular to the light incident axis and parallel to the optical axis, and may be parallel to the z-axis of the drawing; and the third axis may be an axis perpendicular to the first axis and the optical axis, and may be parallel to the x-axis of the drawing.

The folded module 110 may include an OIS driver configured to rotate the reflective member 111 with respect to the housing 101 based on an axis perpendicular to the optical axis. The OIS driver may include a first OIS driver configured to rotate the reflective member 111 based on the first axis perpendicular to the optical axis, and a second OIS driver configured to rotate the reflective member 111 based on the third axis that is perpendicular to the optical axis and orthogonal to the first axis.

The OIS driver rotates the reflective member 111 based on the first axis and/or the third axis, so that shaking of the image formed on the image sensor 131 due to the shaking of the camera module 100 may be optically corrected.

The first OIS driver may be disposed at both sides of the moving holder 112. The first OIS driver may include a first OIS magnet 116a mounted on both sides of the moving holder 112 and a first OIS coil 116c disposed at a portion facing the first OIS magnet 116a. The first OIS coil 116c is fixedly coupled to the housing 101, and due to electromagnetic interaction between the first OIS coil 116c and the first OIS magnet 116a, the moving holder 112 may rotate with respect to the housing 101 based on the first axis perpendicular to the optical axis.

In addition, the second OIS driver may be disposed adjacent to the first OIS driver on both sides of the moving holder 112. The second OIS driver may include a second OIS magnet 117a mounted on both sides of the moving holder 112 and a second OIS coil 117c disposed at a portion facing the second OIS magnet 117a. The second OIS coil 117c is fixedly coupled to the housing 101, and due to electromagnetic interaction between the second OIS coil 117c and the second OIS magnet 117a, the moving holder 112 may rotate with respect to the housing 101 based on the third axis perpendicular to the optical axis.

A middle guide 113 may be disposed between the housing 101 and the moving holder 112 along the optical axis direction. The middle guide 113 may include a plurality of OIS guide grooves 126 for accommodating a plurality of OIS ball members 125. The plurality of OIS guide grooves 126 may be disposed on surfaces facing each other in an optical axis direction. Each of the plurality of OIS ball members 125 may be accommodated in the plurality of OIS guide grooves 126 so that a movement direction thereof may be limited to a direction perpendicular to the optical axis direction. The plurality of OIS ball members 125 may be disposed on the middle guide 113 to be disposed between the housing 101 and the moving holder 112 along the optical axis direction. The moving holder 112 may include a guide groove for accommodating at least one of the plurality of OIS ball members 125 on a surface facing the middle guide 113.

The first OIS coil 116c and the second OIS coil 117c are attached to the substrate 105, and the substrate 105 may be fixed to the housing 101. The housing 101 may include openings 106 configured to expose the first OIS coil 116c and the second OIS coil 117c into the housing 101.

A position sensor configured to measure the rotation angle of the moving holder 112 may be disposed inside or outside the coil. As the middle guide 113 (or the moving holder 112) rotates, the position of the position sensor with respect to the OIS magnets 116a and 117a changes, and based on this position change, the rotation displacement of the middle guide 113 (or the moving holder 112) may be measured. The position sensor may include, for example, a magnetic sensor such as a Hall sensor or a magnetoresistive sensor.

In the inner space of the housing 101, spaces in which the folded module 110 and the lens module 120 are disposed may be divided by a housing protrusion 108. That is, based on the housing protrusion 108, the folded module 110 may be provided at the front side, and the lens module 120 may be provided at the rear side. The housing protrusion 108 may be provided in a shape that protrudes from bottom surfaces adjacent to both inner walls of the housing 101 to the inner space.

A pair of dampers 210 may be fixed between the folded module 110 and the lens module 120 inside the housing 101. The damper 210 may include a support frame 220 and a buffer member 230. The support frame 220 may be made of a metallic material, for example stainless steel (SUS) or the like. An upper end portion of the support frame 220 may be fitted to an insertion protrusion of the housing protrusion 108, and thus the damper 210 may be fixed to the inside of the housing 101. The buffer member 230 may be configured to alleviate noise or impact generated when contacting the folded module 110 or the lens module 120. The buffer member 230 may be seated on a surface of the housing protrusion 108. The damper 210 may be disposed between the folded module 110 and the lens module 120 and may be configured to limit the driving range of the folded module 110 and the lens module 120.

Hereinafter, the configuration of the cover 103 and the moving holder 112 according to the present embodiment and the surroundings thereof will be described in more detail with reference to FIG. 3 to FIG. 6.

Figure 3:
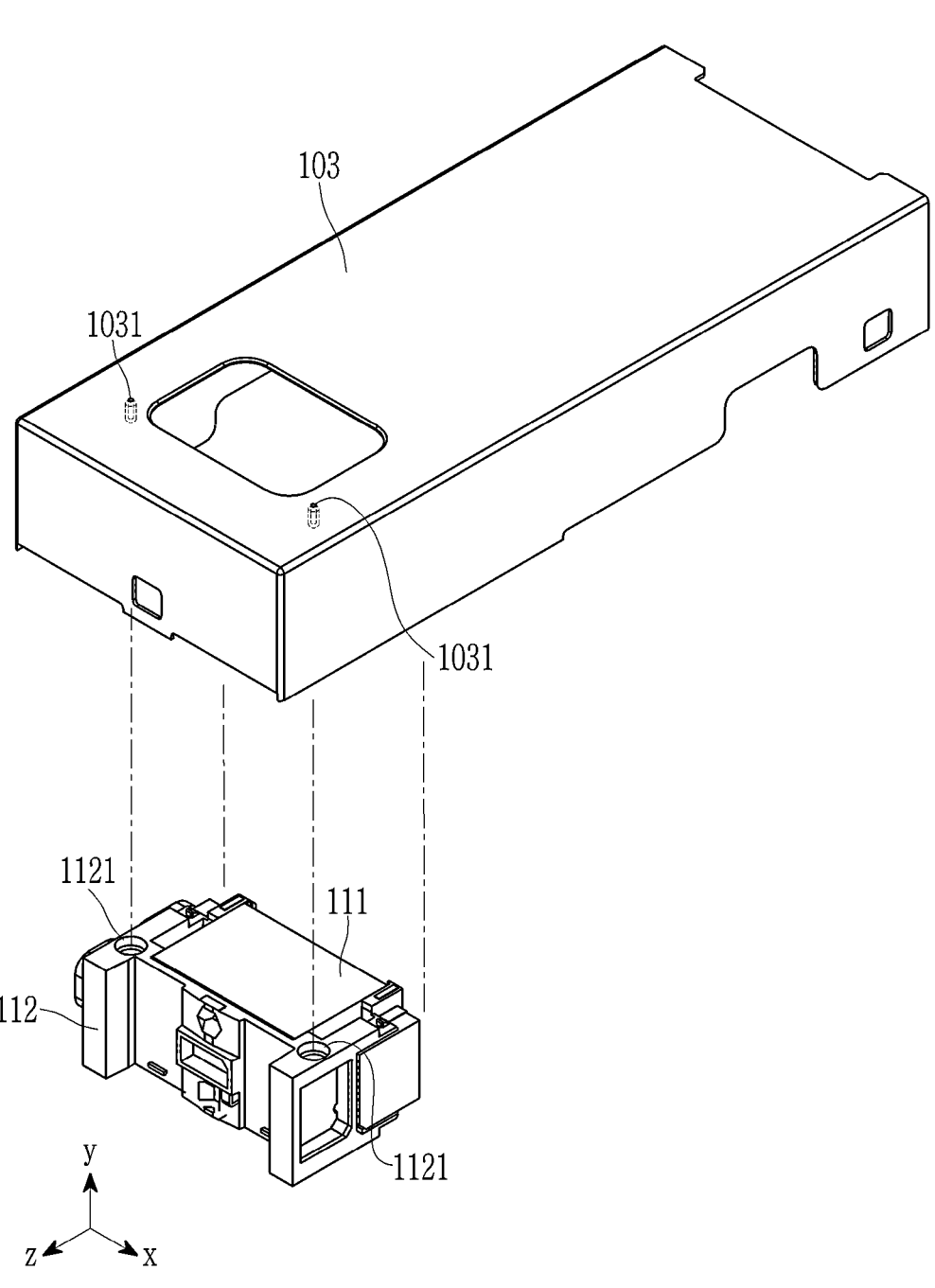
FIG. 3 illustrates an exploded perspective view of a cover and a moving holder according to an embodiment.
Figure 4:
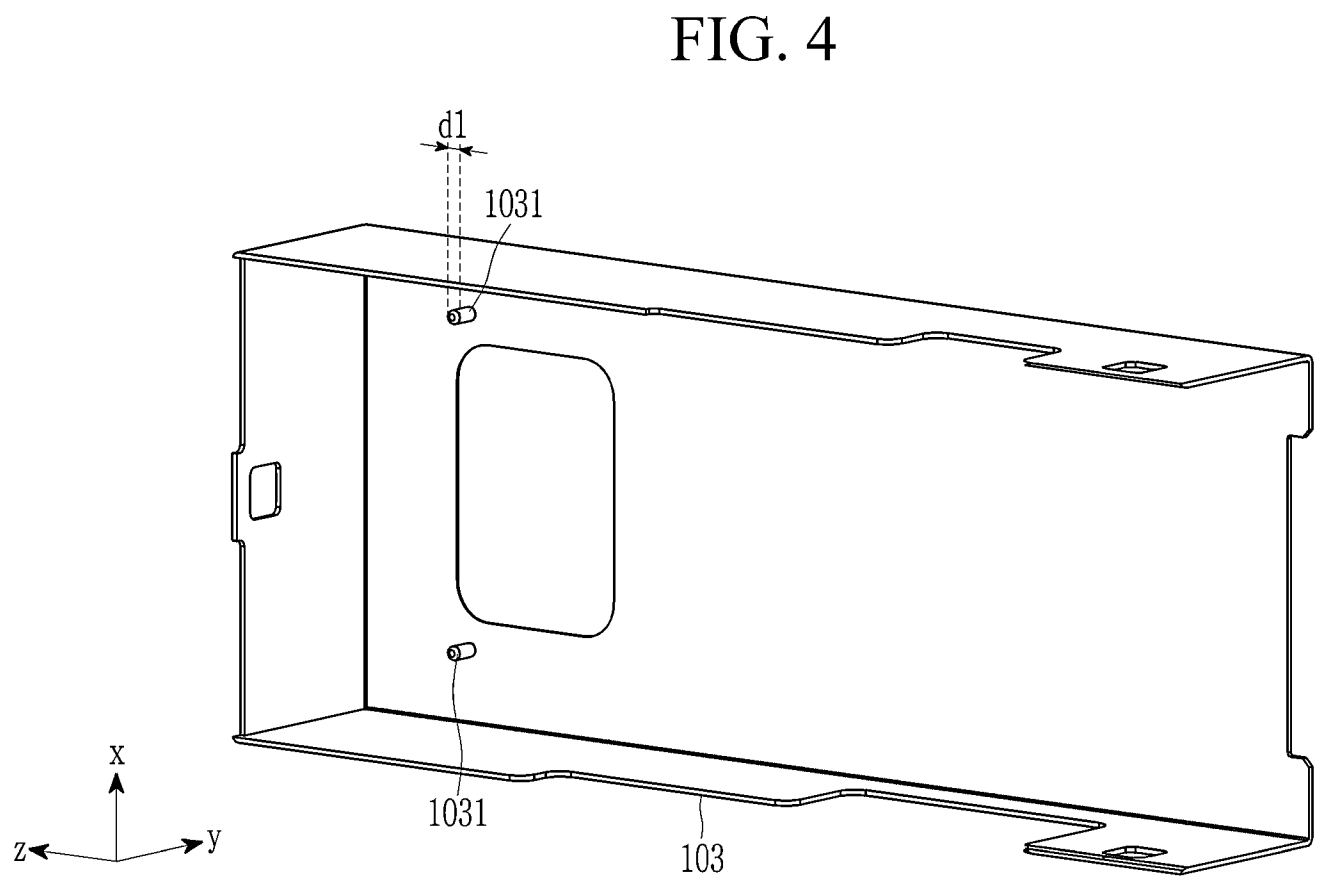
Figure 5:
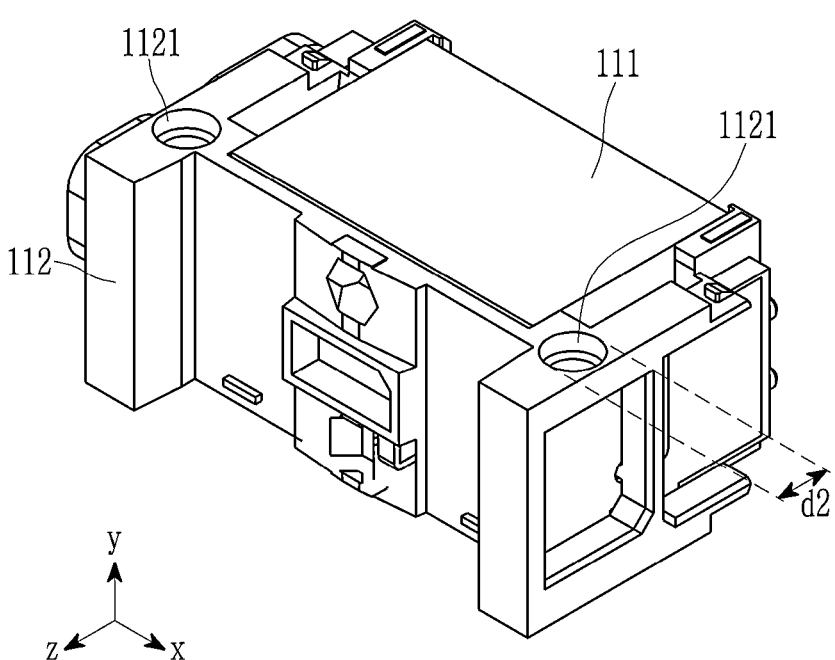
FIG. 5 illustrates a perspective view of a moving holder according to an embodiment.
Figure 6:
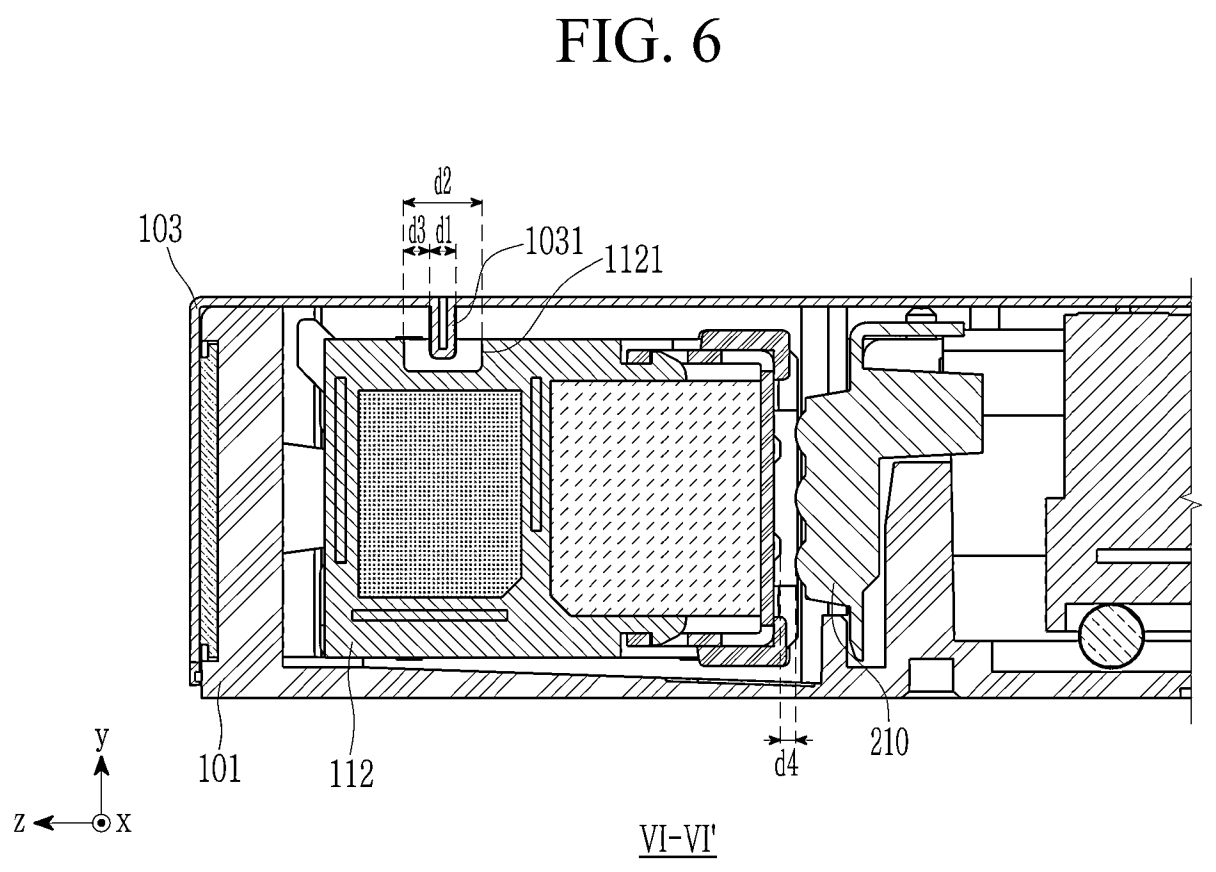

FIG. 3 illustrates an exploded perspective view of a cover and a moving holder according to an embodiment, FIG. 4 illustrates a perspective view of a cover according to an embodiment, FIG. 5 illustrates a perspective view of a moving holder according to an embodiment, and FIG. 6 illustrates a partial cross-sectional view of the cover and the moving holder shown in FIG. 1 taken along lines VI-VI'.

Referring to FIG. 3 and FIG. 4, the cover 103 of the camera module 100, according to the present embodiment, may include a cover protrusion 1031 protruding from a surface facing the moving holder 112. The cover protrusion 1031 may be disposed on a surface facing the moving holder 112 of the cover 103. For example, the protrusion may be disposed on the lower surface of the cover 103 along the first direction. A plurality of cover protrusions 1031 may be included. The plurality of cover protrusions 1031 may be disposed side by side along the third direction. The cover protrusion 1031 may have a shape protruding in the first direction. The cover protrusion 1031 may have a shape protruding toward the moving holder 112. For example, the cover protrusion 1031 may have a cylindrical shape, and may include a material such as stainless steel. The cover protrusion 1031 may be formed through press processing, and in this case, a hole may be formed in the upper surface of the cover 103.

Referring to FIG. 3 and FIG. 5, the moving holder 112 may have a groove portion 1121 opened upward to accommodate the cover protrusion 1031. The groove portion 1121 may be disposed on a surface facing the cover 103 of the moving holder 112. For example, the groove portion 1121 may be disposed on the upper surface of the moving holder 112 in the first direction. The groove portion 1121 may include a plurality of groove portions 1121. The plurality of groove portions 1121 may be disposed side by side along the third direction. The plurality of groove portions 1121 may be disposed on both sides of the reflective member 111. The groove portion 1121 may have a shape recessed in the first direction. For example, a cross-section perpendicular to the first direction of the groove portion 1121 may be circular.

When the cover 103 and the moving holder 112 are coupled, the cover protrusion 1031 may be accommodated in the groove portion 1121. Accordingly, when force in the optical axis direction is applied to the camera module 100, such as when the camera module 100 falls, the movement of the moving holder 112 may be limited. Specifically, as the cover protrusion 1031 is accommodated in the groove portion 1121 and the movement of the moving holder 112 is limited in the optical axis direction, the maximum distance between the middle guide 113 and the housing 101 along the optical axis direction may be smaller than the diameter of the ball member. Accordingly, the plurality of OIS ball members 125 disposed between the moving holder 112 and the housing 101 may be prevented from being separated from the plurality of OIS guide grooves 126.

Referring to FIG. 4 and FIG. 6, along the optical axis direction, a width d1 of the cover protrusion 1031 may be smaller than a width d2 of the groove portion 1121. Accordingly, the moving holder 112 may move even in a state in which the cover protrusion 1031 is accommodated in the groove 1121 so that the moving holder 112 may move to implement the OIS function. For example, when the cover protrusion 1031 has a cylindrical shape, the width d1 of the cover protrusion 1031 may be the diameter of the cover protrusion 1031, along the optical axis direction. In addition, when the cross-section perpendicular to the first direction of the groove portion 1121 is circular, the width d2 of the groove portion 1121 along the optical axis direction may be the diameter of the groove portion 1121.

In addition, referring to FIG. 6, along the optical axis direction, a distance d3 between the cover protrusion 1031 and the groove portion 1121 may be larger than a distance d4 between the moving holder 112 and the damper 210. Here, along the optical axis direction, the distance d3 between the cover protrusion 1031 and the groove portion 1121 may mean a distance along the optical axis direction between the surface of the cover protrusion 1031 and the inner circumferential surface of the groove portion 1121. In addition, along the optical axis direction, the distance d4 between the moving holder 112 and the damper 210 may mean the minimum distance between one side of the moving holder 112 protruding toward the damper 210 and one side of the damper 210 protruding toward the moving holder 112. Accordingly, when force in the optical axis is applied to the camera module 100, such as when the camera module 100 falls, the moving holder 112 and the damper 210 collide before the cover protrusion 1031 and the groove portion 1121 collide, thereby reducing the noise caused by the collision.

One aspect of the disclosed embodiment is to provide a camera module including a coupling structure capable of limiting behavior between a cover and a moving holder upon impact.

According to the camera module of the embodiment, it is possible to prevent an OIS ball from being detached upon impact, to reduce the risk of driving failure, and to reduce noise upon impact.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module that internally reflects and transmits light, incident in a first direction, in a second direction perpendicular to the first direction, comprising:
a housing with an inner space;
a cover coupled to the housing to cover the inner space;
a folded module comprising a moving holder movable in the inner space, and a reflective member disposed on the moving holder to change a path of light incident on the reflective member; and
a lens module comprising a lens barrel adjacently disposed to the folded module in the inner space and having a plurality of lenses arranged in an optical axis direction to pass light reflected from the reflective member,
wherein the cover includes a cover protrusion extending from a surface facing the moving holder, and the moving holder has a groove portion that is opened upward to accommodate the cover protrusion.

2. The camera module of claim 1, wherein the cover protrusion extends in the first direction.

3. The camera module of claim 1, wherein the cover protrusion is disposed on a lower surface of the cover along the first direction.

4. The camera module of claim 1, wherein the cover protrusion includes a plurality of cover protrusions disposed and spaced apart from each other along a third direction perpendicular to the first direction and the second direction.

5. The camera module of claim 1, wherein the groove portion is opened upward along the first direction.

6. The camera module of claim 1, wherein the groove portion is disposed on an upper surface of the moving holder along the first direction.

7. The camera module of claim 1, wherein the groove portion comprises a plurality of groove portions disposed and spaced apart from each other along a third direction perpendicular to the first direction and the second direction.

8. The camera module of claim 7, wherein the plurality of groove portions are disposed on both sides of the reflective member.

9. The camera module of claim 1, wherein, along the optical axis direction, a width of the cover protrusion is smaller than a width of the groove portion.

10. The camera module of claim 1, further comprising a damper disposed between the folded module and the lens module inside the housing, wherein a distance between the cover protrusion and the groove portion, along the optical axis direction, is larger than a distance between the moving holder and the damper, along the optical axis direction.

11. The camera module of claim 1, further comprising:
a middle guide disposed between the housing and the moving holder, along the optical axis direction; and
a plurality of ball members disposed on the middle guide, wherein, along the optical axis direction, a maximum distance between the middle guide and the housing is smaller than a diameter of the plurality of ball members.

12. The camera module of claim 11, wherein the middle guide has a plurality of guide grooves accommodating the plurality of ball members.

13. The camera module of claim 1, wherein the cover protrusion has a cylindrical shape.

14. A folded camera module, comprising:
a cover coupled to a housing to cover an inner space of the housing;
a folded module, comprising a moving holder movable in the inner space, and a reflective member disposed on the moving holder to change a path of light incident on the reflective member; and
a lens module comprising a lens barrel adjacently disposed to the folded module in the inner space and having a plurality of lenses arranged in an optical axis direction to pass light reflected from the reflective member,
wherein the cover includes a cover protrusion extending from a surface facing the moving holder, and the moving holder has a groove portion accommodating the cover protrusion and the cover protrusion is slidable within the groove portion.

15. The folded camera module of claim 14, wherein the cover protrusion extends in a first direction, a light incident direction, and is disposed on a lower surface of the cover along the first direction.

16. The folded camera module of claim 15, wherein the groove portion is disposed on an upper surface of the moving holder along the first direction.

17. The folded camera module of claim 14, further comprising
a damper disposed between the folded module and the lens module inside the housing,
wherein a distance between the cover protrusion and the groove portion, along the optical axis direction, is larger than a distance between the moving holder and the damper, along the optical axis direction.

* * * * *